(12) United States Patent
Ebner (10) Patent No.: US 10,024,521 B2
(45) Date of Patent: Jul. 17, 2018

(54) OPTICAL ELEMENT, AND ASSEMBLY FOR EMITTING LIGHT

(71) Applicant: ZUMTOBEL LIGHTING GMBH, Dornbirn (AT)

(72) Inventor: Stephan Ebner, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 0 days.

(21) Appl. No.: 15/102,433

(22) PCT Filed: Dec. 16, 2014

(86) PCT No.: PCT/EP2014/077905
§ 371 (c)(1),
(2) Date: Jun. 7, 2016

(87) PCT Pub. No.: WO2015/091444
PCT Pub. Date: Jun. 25, 2015

(65) Prior Publication Data
US 2016/0320025 A1 Nov. 3, 2016

(30) Foreign Application Priority Data
Dec. 17, 2013 (DE) .......................... 10 2013 226 181

(51) Int. Cl.
*G02B 6/00* (2006.01)
*F21V 13/04* (2006.01)
(Continued)

(52) U.S. Cl.
CPC ............... *F21V 13/04* (2013.01); *F21V 5/00* (2013.01); *F21V 7/0091* (2013.01); *G02B 6/00* (2013.01);
(Continued)

(58) Field of Classification Search
CPC ............ G02B 19/0066; G02B 19/0019; G02B 19/0028; G02B 6/3522; F21V 13/04; F21V 7/0091; F21Y 2103/10
See application file for complete search history.

(56) References Cited

U.S. PATENT DOCUMENTS 6,097,549 A * 8/2000 Jenkins ................ B60Q 1/302
359/726
8,026,529 B2 9/2011 Huang
(Continued)

FOREIGN PATENT DOCUMENTS

CN 101598292 12/2009
DE 102007013082 9/2008
(Continued)

OTHER PUBLICATIONS

International Search Report for PCT/EP2014/077905, English translation attached to original, Both completed by the European Patent Office dated Feb. 10, 2015, All together 5 Pages.
(Continued)

*Primary Examiner* — Suezu Ellis
(74) *Attorney, Agent, or Firm* — Brooks Kushman P.C.

(57) ABSTRACT

An optical element for influencing a light emitted by a light source, having a front side facing away from and a rear side facing the light source. A recess for the input of the light is formed on the rear side, and a deflecting surface region is formed. On the front side, a frontside surface region is formed. First light beams (L1) entering the optical element via the recess, are totally reflected at the deflecting surface region and exit the optical element via the front-side surface region. The front-side surface region causes the second light beams (L2) of the light, which enter the optical element via the recess and then hit the front-side surface region directly, to undergo total reflection. High intensity light beams from the light source can be distributed onto a larger region reducing the maximum luminance of the light emitted via the front-side surface region.

11 Claims, 13 Drawing Sheets

(51) Int. Cl.
  *F21V 5/00*   (2018.01)
  *G02B 19/00*  (2006.01)
  *F21V 7/00*   (2006.01)
  *F21Y 103/10* (2016.01)
  *F21Y 115/10* (2016.01)

(52) U.S. Cl.
  CPC ..... *G02B 19/0028* (2013.01); *G02B 19/0066* (2013.01); *F21Y 2103/10* (2016.08); *F21Y 2115/10* (2016.08)

(56) References Cited

U.S. PATENT DOCUMENTS

| | | | |
|---|---|---|---|
| 9,366,799 B2* | 6/2016 | Wilcox | F21S 8/061 |
| 9,416,951 B1* | 8/2016 | Householder | F21V 7/0091 |
| 2003/0189832 A1 | 10/2003 | Rizkin et al. | |
| 2004/0070855 A1 | 4/2004 | Benitez et al. | |
| 2004/0070989 A1 | 4/2004 | Amano et al. | |
| 2006/0291201 A1 | 12/2006 | Smith | |
| 2010/0259153 A1 | 10/2010 | Futami | |
| 2012/0313534 A1 | 12/2012 | Urtiga et al. | |
| 2013/0163258 A1 | 6/2013 | Tang | |

FOREIGN PATENT DOCUMENTS

| | | |
|---|---|---|
| DE | 102008061716 | 6/2010 |
| DE | 102012205067 | 10/2013 |

OTHER PUBLICATIONS

Search Report for GM 461/2013, Completed by the Austrian Patent Office, dated Jul. 26, 2016, 1 Page.

Chinese Search Report for Chinese Application No. 2014800681665, dated Feb. 22, 2018, 1 Page.

* cited by examiner

OPTICAL ELEMENT, AND ASSEMBLY FOR EMITTING LIGHT

CROSS-REFERENCE TO RELATED APPLICATION

This application is the U.S. national phase of PCT Application No. PCT/EP2014/077905 filed on Dec. 16, 2014, which claims priority to DE Patent Application No. 10 2013 226 181.0 filed on Dec. 17, 2013, the disclosures of which are incorporated in their entirety by reference herein.

The invention relates to an optical element for influencing light emitted by a light source, and to an assembly for emitting light comprising such an optical element.

DE 10 2012 205 067 A1 discloses a luminaire comprising an LED light source (LED: light emitting diode) and a lens arrangement for optically influencing the light emitted by the LED light source. The main body of the lens arrangement is formed approximately in the shape of a truncated cone and has, on its rear side facing the LED light source, a depression for the LED light source. The depression consists of a convexly shaped base surface and side surfaces. Light rays which enter the lens arrangement via the base surface are concentrated by said lens arrangement and then emerge again on the front side opposite the depression; in this case, said light rays experience no further interaction with a boundary surface of the lens arrangement. Light rays which enter the lens arrangement via the side surfaces of the depression are subjected to total internal reflection at the lateral surfaces of the lens arrangement that are formed by the truncated cone shape, and subsequently likewise emerge again via the front side.

It has been found that a comparatively high luminance occurs in a central region of the light emission in the case of such a lens arrangement. This bright region is attributable to those light rays which enter the lens arrangement via the base surface of the depression and then emerge again directly via the front side. On account of said high luminance, the light emission generally has an unpleasant effect on an observer looking at the front side of the lens arrangement.

In order to avoid this problem, lens systems are already known from the prior art; however, said systems comprise reflectively coated surfaces that have to be produced in an additional processing step.

The invention is based on the object of specifying a correspondingly improved optical element. In particular, the optical element is intended to have improved optical properties in conjunction with the possibility of simple production. Moreover, the intention is to specify an assembly for emitting light comprising such an optical element.

This object is achieved according to the invention by means of the subjects mentioned in the independent claims. Particular types of embodiment of the invention are specified in the dependent claims.

The invention provides an optical element for influencing light emitted by a light source, comprising a front side facing away from the light source, and also a rear side facing the light source. At the rear side a light entrance region for entrance of the light is formed and moreover a deflecting surface region is formed, and at the front side a front-side surface region is formed. In this case, the design is such that first light rays of the light which enter the optical element via the light entrance region are subjected to total internal reflection at the deflecting surface region and subsequently leave the optical element via the front-side surface region. In this case, the front-side surface region is designed in a manner shaped in such a way that second light rays of the light which enter the optical element via the light entrance region and then impinge directly on the front-side surface region experience a total internal reflection there.

What can be achieved by this design of the front-side surface region is that light rays of the light source which have a comparatively high intensity are distributed over a larger region, such that overall the maximum luminance of the light emitted via the front-side surface region is reduced. If a series of LEDs are considered as light source, for example, then said LEDs—without an optical element— emit light exhibiting high luminances at points; use of the optical element makes it possible as it were to spread apart said high luminances at points.

Preferably, the optical element is designed in such a way that the second light rays—at least partly—after they have experienced the total internal reflection at the front-side surface region, experience a further total internal reflection at the deflecting surface region. This enables the light to be utilized particularly efficiently.

Preferably, the front-side surface region is formed by a depression directed toward the light entrance region or comprises such a depression. What can be achieved particularly suitably in this way is that the second light rays are subjected to total internal reflection at the front-side surface region. In particular, in this case there is no need for a reflectively coated surface for deflecting the relevant light rays.

Preferably, the optical element is shaped in such a way that all light rays of the light which enter the optical element via the light entrance region and leave the optical element via the front-side surface region experience at least one total internal reflection at an interface of the optical element. As a result, a maximum luminance of the light emission can be reduced particularly effectively.

Preferably, the optical element is shaped symmetrically with respect to an axis of symmetry or a plane of symmetry. A particularly uniform light emission via the front-side surface region is achievable as a result.

Preferably, the deflecting surface region is formed in a stepped fashion, in particular in a multiply stepped fashion. What can be achieved as a result is that the light rays are distributed over a particularly large region, such that high luminances are further reduced.

Preferably, the light entrance region is formed by a recess. What can be achieved as a result is that suitably a particularly large amount of the light emitted by the light source enters the optical element.

Preferably, the recess has a base wall and side walls. A particularly simple design of the recess in conjunction with high lighting effectiveness is achievable as a result. A particularly simple and suitable design is made possible in this case if the base wall and the side walls are shaped in a plane fashion. A particularly suitable concentration of the light rays upon entrance into the optical element can be achieved in this case if the base wall and the side walls are shaped convexly. In this case, provision may also be made for the base wall to be shaped in a plane fashion and the side walls to be shaped in a convex fashion, or the other way around.

Preferably, the recess is designed to receive two LEDs.

Preferably, the optical element is designed in the form of a profile element. A particularly suitable production of the optical element is made possible as a result.

A further aspect of the invention provides an assembly for emitting light, comprising a light source for emitting light and an optical element according to the invention, wherein the assembly is designed in such a way that the light enters the optical element at least partly via the light entrance region. Preferably, the light source comprises at least one LED since the optical element is particularly suitable for "resolving" high luminances at points, such as occur in the case of LEDs.

Preferably, the optical element is designed in the form of a profile element, wherein the light source comprises a plurality of LEDs arranged along a series extending parallel to the principal axis of the profile element. As a result, a particularly effective reduction of the luminances is achievable in conjunction with a possibility of simple production.

The invention is explained in greater detail below on the basis of an exemplary embodiment and with reference to the drawings, in which.

Figure 1:
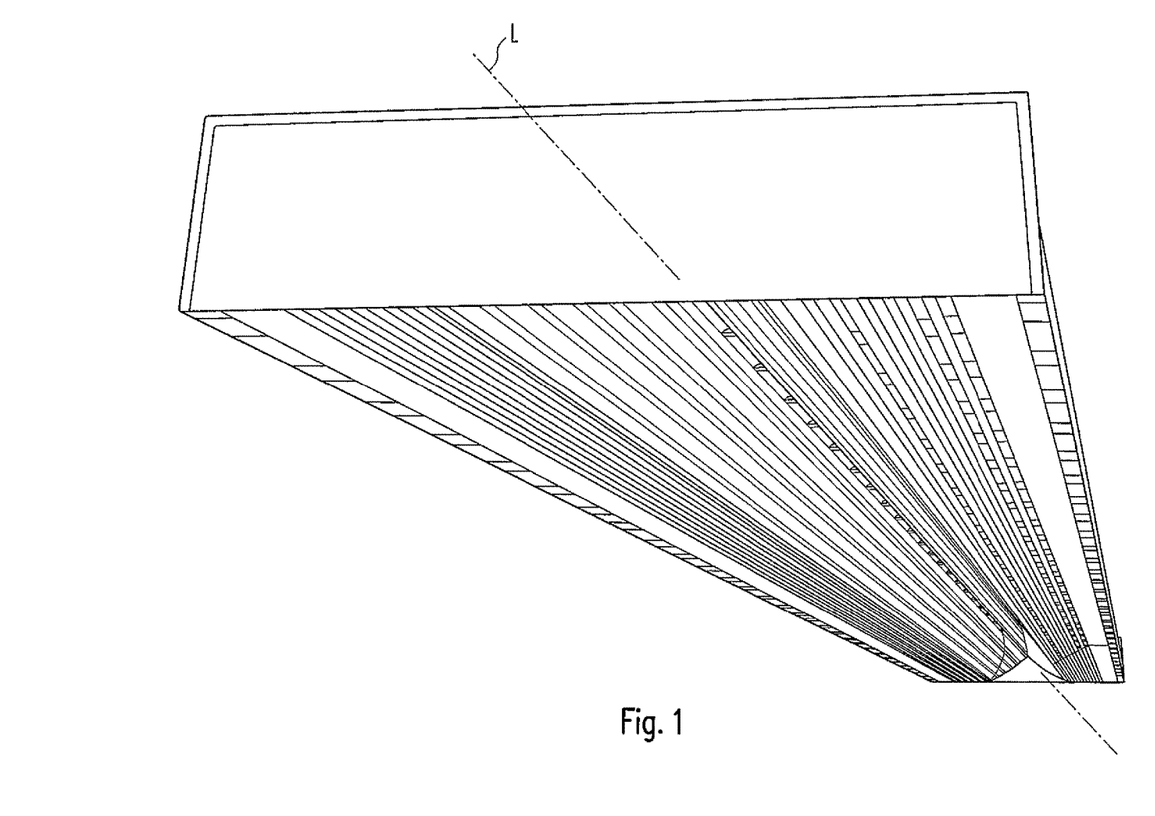
FIG. 1 shows a perspective schematic diagram of an assembly for emitting light comprising an optical element according to the invention.

FIG. 1 schematically depicts in perspective view one example of an assembly for emitting light according to the invention with a viewing direction obliquely from below. The assembly may—as indicated in FIG. 1—be designed as a luminaire, for example as a ceiling luminaire, such that a light emission downward is provided. Such an orientation of the assembly relative to the vertical is assumed in the present description. In general, however, a different orientation may also be provided; in this case, the present direction indications, etc. should be correspondingly reinterpreted.

In the case of the example shown in FIG. 1, the assembly comprises a parallelepipedal, downwardly open housing in which an optical element according to the invention for influencing light emitted by a light source is arranged. A light emission opening facing downward is formed through the housing, wherein the optical element is arranged in a manner inserted into said light emission opening. The light source is also arranged within the housing, but is not directly discernible in FIG. 1 since it is situated behind the housing wall or behind the optical element.

The optical element is designed in an elongate fashion in the example shown here, such that it extends along a longitudinal axis L. The housing also extends preferably along the longitudinal axis L.

Figure 2:
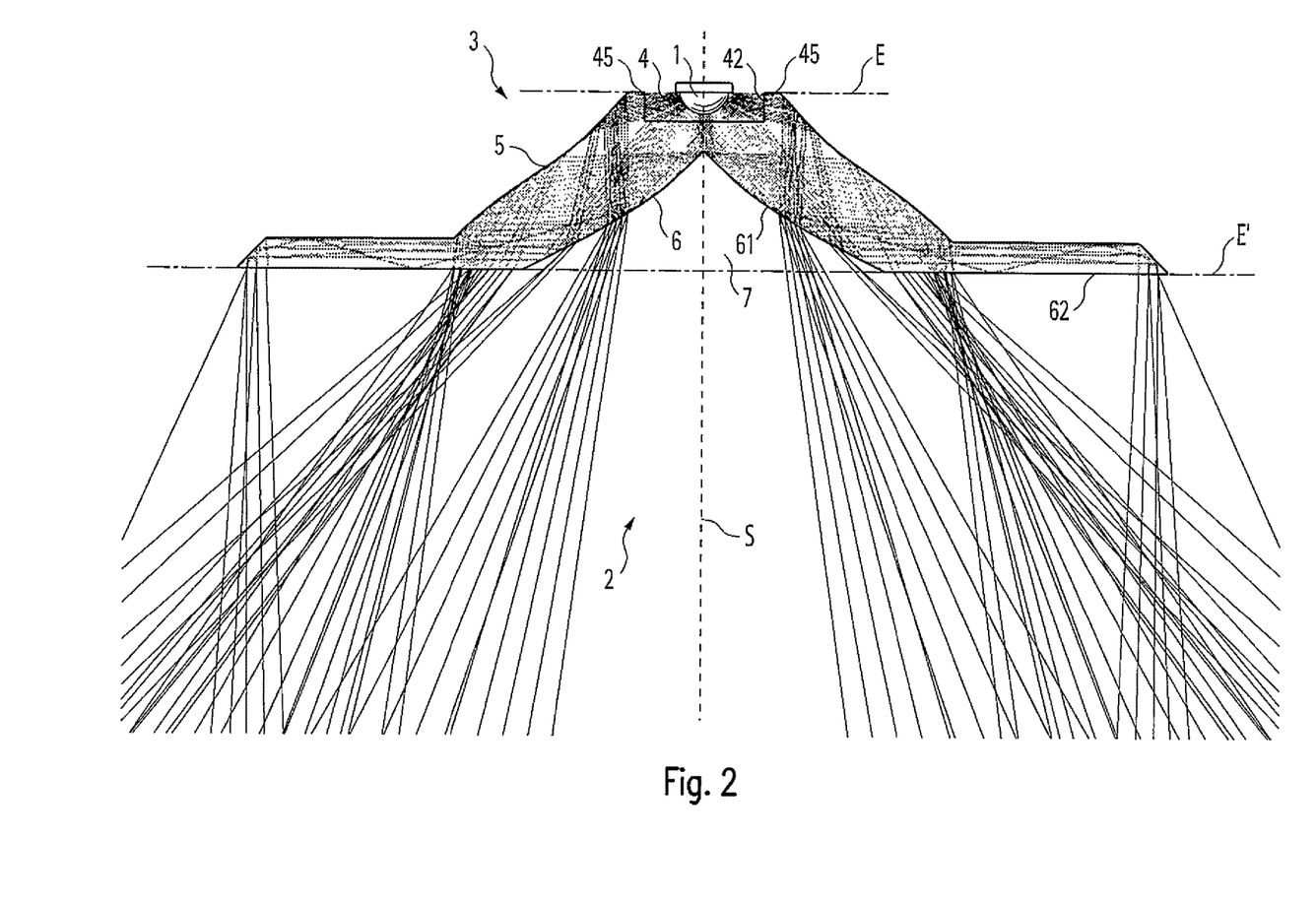
FIG. 2 shows a cross-sectional schematic diagram through the optical element and a light source with light rays.

FIG. 2 schematically depicts a cross section through the optical element normal to the longitudinal axis L. Moreover, FIG. 2 schematically depicts a corresponding light source 1 in the form of an LED. Furthermore, FIG. 2 depicts by way of example light rays which represent light emitted by the light source 1 and illustrate the passage of the light through the optical element.

The optical element comprises a front side 2 and a rear side 3, wherein the front side 2 is provided for being arranged with orientation facing away from the light source 1, and the rear side 3 is provided for being arranged with orientation facing the light source 1. In the case of the abovementioned exemplary orientation of the assembly and of the optical element as shown here, the rear side 3 of the optical element faces upward and the front side 2 faces downward.

At the rear side 3 of the optical element a light entrance region is formed, in particular in the form of a recess 4, which is provided for entrance of the light emitted by the light source 1. In particular, provision may be made for the recess 4 to have an edge region 45 that runs in a horizontal plane E, for example.

Preferably, it is provided that the light source 1 is arranged at least partly in the recess 4 or such that it is arranged at least partly below the plane E. A particularly direct entrance of the light into the optical element is made possible as a result.

Figure 3:
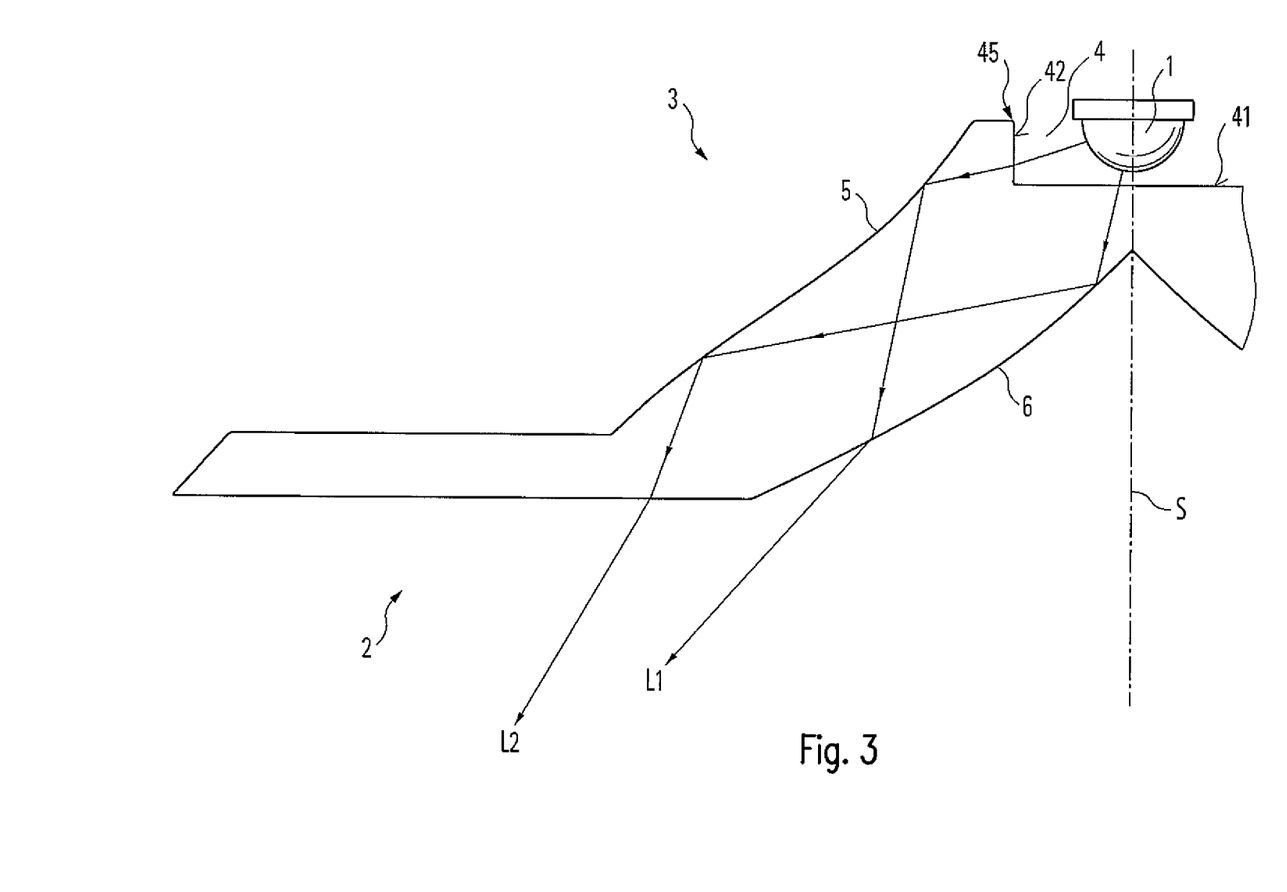
FIG. 3 shows a basic schematic diagram regarding the course of first and second light rays.

FIG. 3 schematically depicts a further cross section normal to the longitudinal axis L, said cross section encompassing an excerpt from the optical element and also the light source 1. The recess 4 is preferably designed in such a way that it has a base wall 41 and side walls 42. In the example shown here, the base wall 41 and the side walls 42 are shaped in a plane fashion. In this case, basically one part of the light emitted by the light source 1 enters the optical element via the base wall 41, and a further part via the side walls 45.

In the case of the example depicted schematically in FIGS. 2 and 3, the light source 1 is formed by at least one LED having a, for example plane, light emitting surface, wherein the LED here is aligned such that the light emitting surface is oriented horizontally and in a manner facing downward. Preferably, the light emitting surface in this case is arranged completely below the plane E.

An LED typically emits light rays in all directions of a half-space, wherein the half-space is defined for example by the plane light emitting surface of the LED; in the example shown, the light is emitted into the lower half-space. In this case, light rays are emitted "toward the front", here "downward"—that is to say into a small solid angle range around the surface normal of the plane light emitting surface or around the vertical—and said light rays have a higher intensity than further light rays emitted more toward the sides, that is to say in a flatter fashion. Therefore, here light rays which enter the optical element via the base wall 41 of the recess 4 have a higher intensity than those light rays which enter the optical element via the side walls 42 of the recess 4.

At the rear side 3 of the optical element moreover a deflecting surface region 5 is formed, and at the front side a front-side surface region 6 is formed, wherein the design is such that—as indicated in principle in FIG. 3—first light rays L1 of the light which enter the optical element via the recess 4 are subjected to total internal reflection at the deflecting surface region 5 and subsequently leave the optical element via the front-side surface region 6. By way of example, the design in this case is such that all light rays which enter the optical element via the side walls 42 of the recess 4 are subjected to total internal reflection at the deflecting surface region 5 and subsequently leave the optical element via the front-side surface region 6; in other words, the first light rays L1 preferably comprise all light rays which enter the optical element via the side walls 42.

The front-side surface region 6 is designed in a manner shaped in such a way that second light rays L2 of the light which enter the optical element via the recess 4 and then impinge directly on the front-side surface region 6 experience a total internal reflection there. In this case, "directly" is intended to express the fact that the second light rays L2 experience no interaction with a surface region of the optical element between their entrance into the optical element via the light entrance region or the recess 4 and their impingement on the front-side surface region 6.

As depicted schematically by way of example in FIG. 3, in this case the design is furthermore preferably such that the second light rays L2, after their total internal reflection at the front-side surface region 6, experience a further total internal reflection at the deflecting surface region 5 before they leave the optical element via the front-side surface region 6. In this case, provision may be made for at least a predominant portion of the second light rays L2, particularly preferably all the second light rays L2, to experience only the two or exactly the two total internal reflections mentioned upon passage through the optical element.

Preferably, a design in this case is such that all light rays which enter the optical element via the base wall 41 of the recess 4 are subjected to total internal reflection directly at the front-side surface region 6; in other words, the second light rays L2 preferably comprise all light rays which enter the optical element via the base wall 41.

What can be achieved in this way is, in particular, that light rays of the light source which have a comparatively high intensity are deflected toward the sides and are thus distributed over a larger or horizontally wider region. What can be achieved as a result is that the maximum luminance of the light emission via the front-side surface region 6 is reduced. This is generally more pleasant for an observer looking at the front side 2 of the optical element.

Preferably, in this case, the optical element is shaped in such a way that all light rays of the light of the light source 1 which enter the optical element via the recess 4 and leave the optical element via the front-side surface region 6 experience at least one total internal reflection at an interface of the optical element. For this purpose, provision may be made, in particular, for all the light rays of the light to enter the optical element either via the base wall 41 of the recess 4 or via the side walls 45 of the recess 4, wherein preferably all those light rays which enter via the base wall 41 form the second light rays L2 and all those light rays which enter via the side walls 42 form the first light rays L1.

In order to bring about the deflection of the first light rays L1 particularly suitably, the front-side surface region 6 preferably has a depression 7 directed toward the light entrance region or the recess 4. In the case of the orientation shown here, therefore, the depression is formed "upward". In particular, the front-side surface region 6 may be formed by such a depression 7. In this case, the depression 7 may be designed as a notch advantageously in terms of production engineering.

In the case of the example shown in FIG. 2, the front-side surface region 6 has a first portion 61 and a second portion 62, wherein the depression 7 is formed by the first portion 61; in this case, the second portion 62 may be designed such that it runs in a planar fashion in a further plane E', wherein the further plane E' is preferably oriented parallel to the first-mentioned plane E, that is to say is likewise oriented horizontally.

Preferably, the optical element is shaped symmetrically with respect to an axis of symmetry or plane of symmetry. By way of example, the optical element may be designed in a manner shaped rotationally symmetrically about a vertical axis.

In the example shown, the optical element is formed symmetrically with respect to a vertical plane of symmetry S. In this case, the recess 4 is formed around the plane of symmetry S, such that the optical element is suitable for a "central" light source. In this case, the deflecting surface region 5 has two portions, one each on each side of the recess 4 or the plane of symmetry S.

Preferably, accordingly, in particular the depression 7 is also designed symmetrically with respect to the plane of symmetry S. As a result of the shaping described, the optical element comprises as it were two "lens wings" formed symmetrically with respect to the plane of symmetry S.

As is intimated from FIG. 1, the optical element may be designed overall in the form of a profile element advantageously in terms of production engineering; in this way, as it were a "translation lens" may be formed by the optical element. In this case, the optical element can advantageously be produced by an extrusion or injection molding method, for example.

In the example shown, the depression 7 forms a beam splitter for the light rays directed toward the front; those light rays which have a particularly high intensity are deflected toward the sides by said beam splitter. As a result, a maximum luminance can be reduced particularly effectively. As is evident from FIG. 2, what can thus be achieved by means of the optical element is that the light of the light source 1 is spread apart within the lens wings and the high luminances of the relatively small light source 1 are distributed over a comparatively large region. The light emission from the optical element makes a significantly more pleasant impression on an observer in this way.

Figure 4:
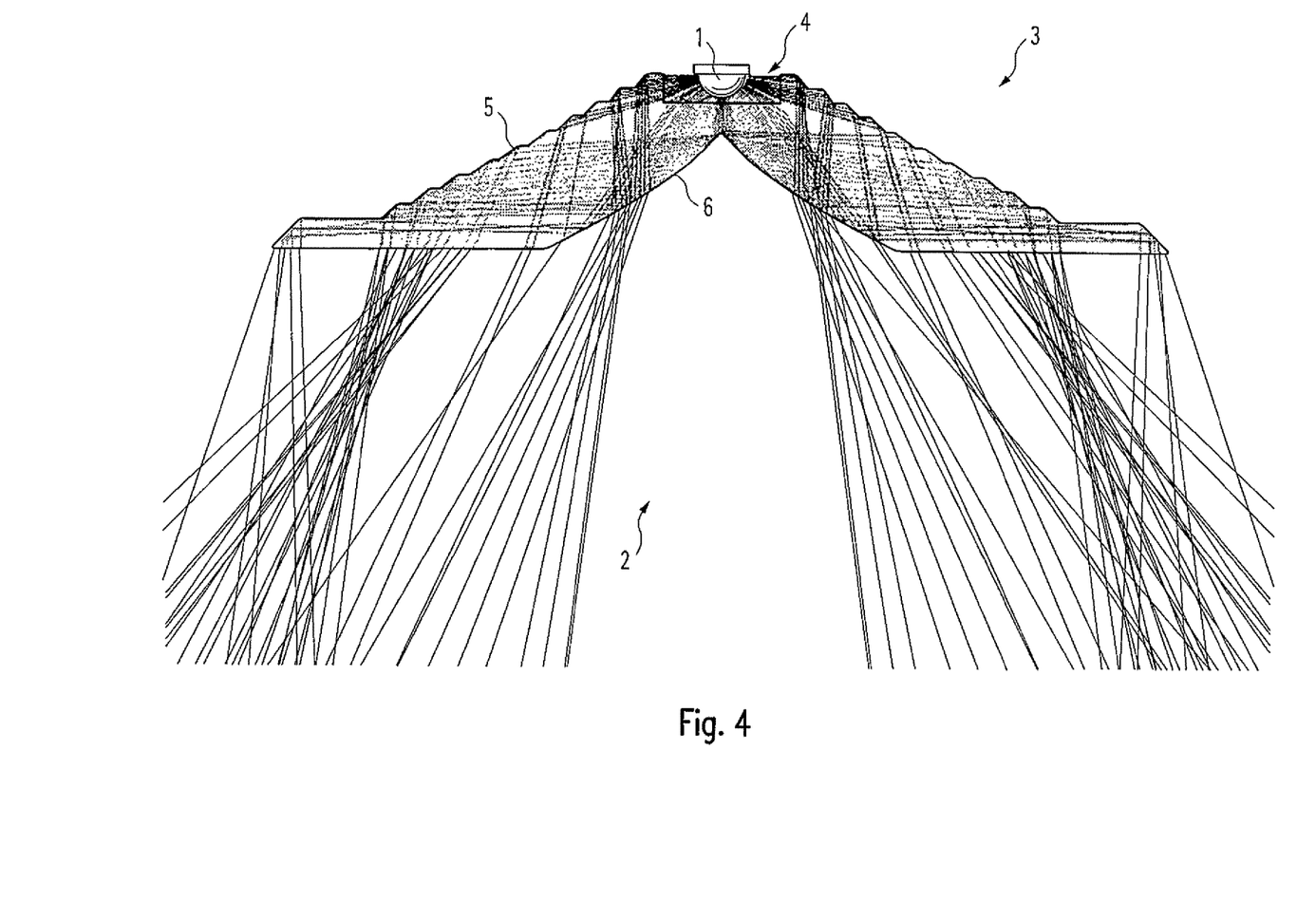
FIG. 4 shows a cross-sectional schematic diagram regarding a variant of the optical element shown in FIG. 2.

FIG. 4 schematically depicts a variant, wherein the reference signs are used analogously. In contrast to the example shown in FIG. 2, here the deflecting surface region 5 is formed in a multiply stepped fashion. As a result of this design, the light can be distributed particularly suitably and uniformly toward the sides or into the lens wings. In this case, the steps thus formed in the deflecting surface region 5 may be provided with a structure, for example a prism or pyramid structure, or be grooved or designed in accordance with a specific, for example curved, geometry, that is to say for example designed in a lens-shaped fashion; as a result, the light can be directed in a particularly targeted manner in order to further reduce luminances of the reflective surfaces. In particular, the inclinations of surfaces or flank regions of the steps can be chosen correspondingly for this purpose.

The deflecting surface region 5 may in particular be such that it comprises both structure elements formed in a manner extending parallel to the longitudinal axis L, and further structure elements formed in a manner extending transversely with respect thereto, in particular at right angles with respect to the longitudinal direction L. As a result, an influencing of the direction distribution of the light emission of the optical element or of the assembly in different vertical planes can be realized particularly suitably.

The second portion 62 of the front-side surface region 6 may also have a structuring; as a result, a further light directing can be achieved particularly suitably. This structuring of the front-side surface region 6 may also comprise both structure elements extending parallel to the longitudinal axis L and further structure elements extending transversely with respect thereto, in particular at right angles with respect to the longitudinal direction L.

Figure 5:
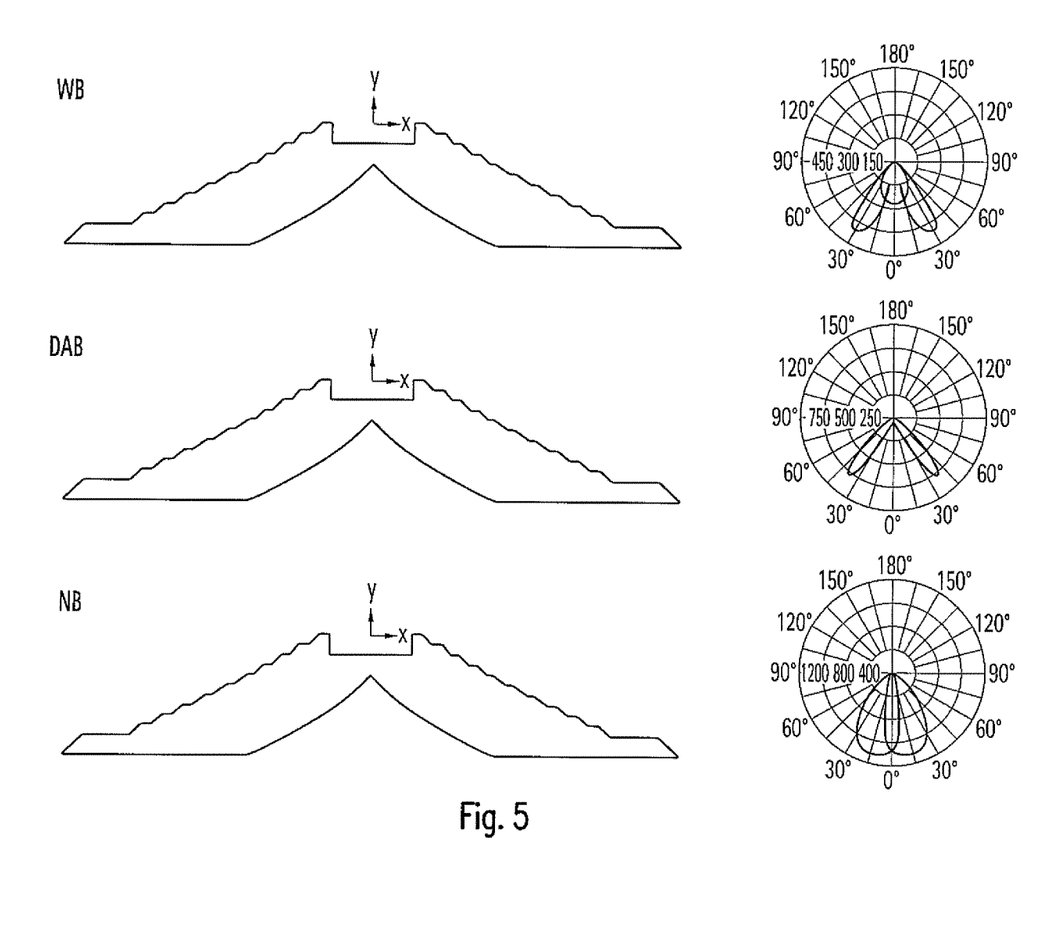
FIG. 5 shows a schematic diagram regarding different designs of the rear side of the optical element and different light distribution characteristics achievable as a result.

The emission characteristic of the assembly may be varied to a considerable extent by the choice of a design of the deflecting surface region 5. This is indicated in FIG. 5, which shows in three rows one below another in each case a corresponding optical element in cross section and next to that on the right in each case an associated light distribution curve. In the case of the example shown in the top row, a wide light emission is generated which exhibits two lateral wings in the sense of a so-called batwing distribution. In the case of the example shown in the middle row, a batwing distribution is likewise generated, although here the two wings of the distribution are narrower. In the case of the example shown in the bottom row, a light distribution is generated in which the two wings overall are directed more toward the front, such that they distinctly overlap one another.

The different light distributions can be achieved in this case without needing to alter the front side 2 of the optical element for this purpose. Therefore, corresponding optical elements having different effects may advantageously be produced using an injection molding tool in which merely the insert shaping the rear side is exchanged; this is advantageous with regard to production. The optical elements thus produced accordingly each have front sides of identical type, such that, if they are inserted in a housing, as depicted schematically in FIG. 1, they practically all exhibit the same appearance.

Figure 6:
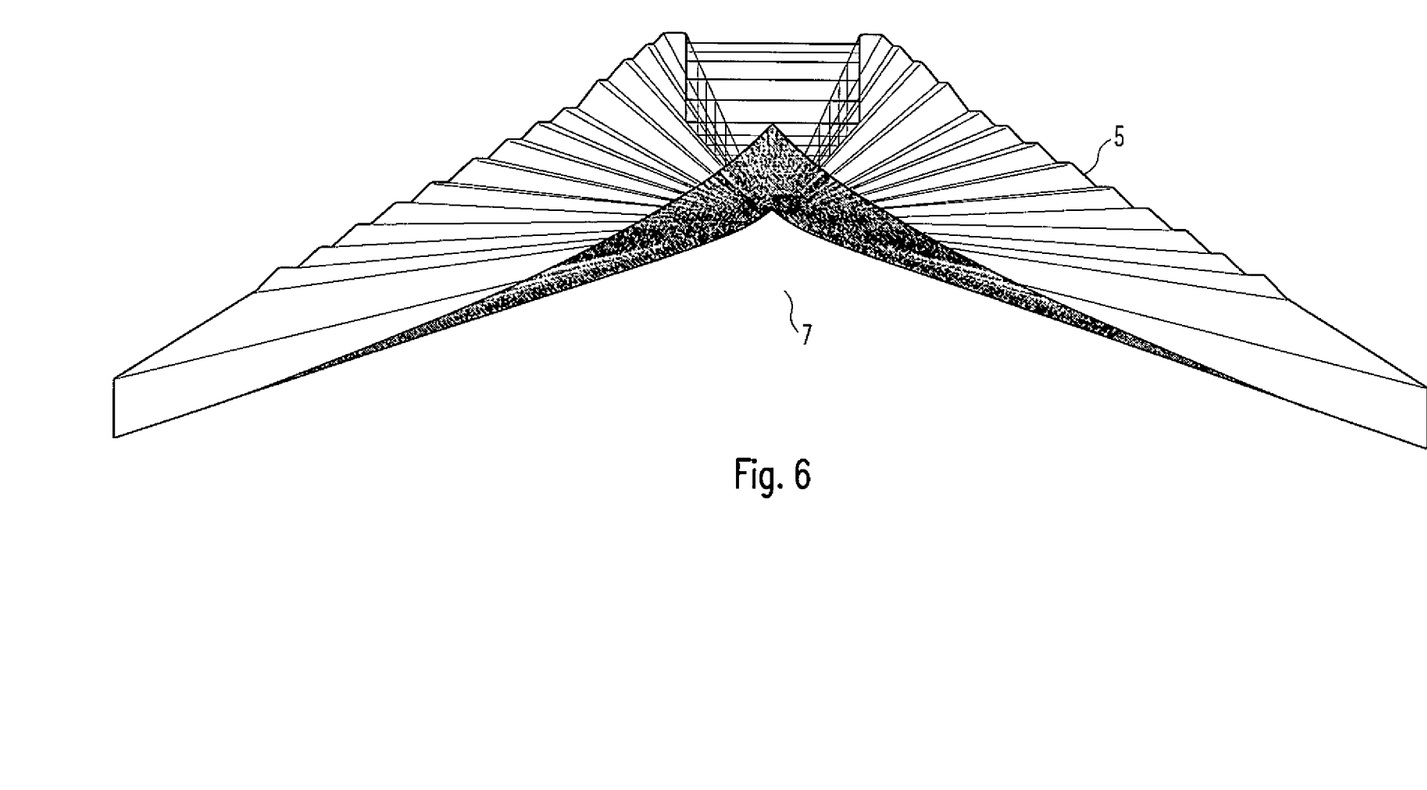
FIG. 6 shows a perspective, see-through schematic diagram regarding a further variation of the optical element.

FIG. 6 schematically depicts in perspective view a further variation of the optical element, in which the front-side surface region 6 is formed by a corresponding depression 7, that is to say has no horizontal plane regions. In this way, as it were two "oblique" lens wings are formed. The emission characteristic of the optical element can furthermore be advantageously varied by such a variation of the front-side surface region 6.

Figure 7:
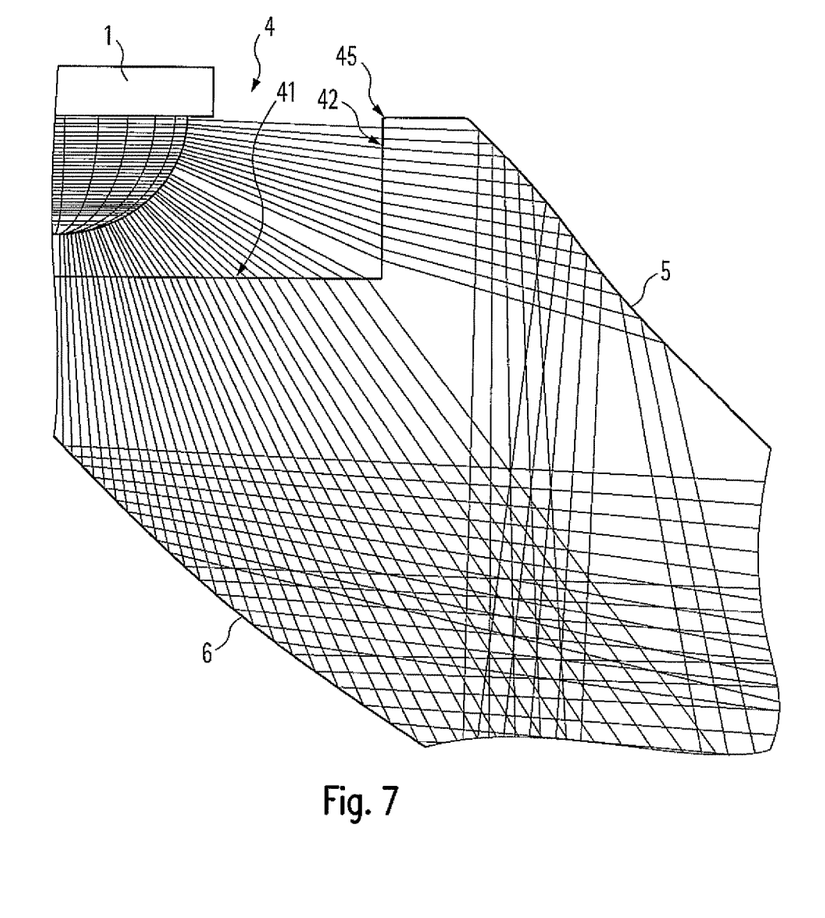
FIG. 7 shows a cross-sectional schematic diagram around a half of the recess of the optical element.

FIG. 7 shows a cross-sectional schematic diagram around a half of the recess 4 of the optical element. Only the right-hand half of the recess 4 is depicted schematically here, since the recess 4, as mentioned above, is designed symmetrically around the plane of symmetry S in this example. The base wall 41 of the recess 4 is designed in a plane fashion and the side walls 42 of the recess 4 are likewise designed in a plane fashion. The first light rays L1 enter the optical element via the base wall 41 of the recess and the second light rays L2 enter the optical element via the side walls 42. Such a "simple" design which splits the light into two "main beam paths" or "light paths" has proved to be particularly suitable. The "light path" with the single total internal reflection accordingly enters the optical element via the side walls 42 and the "light path" with the double total internal reflection enters the optical element via the base wall 41. However, geometrical designs deviating therefrom may be advantageous for achieving specific emission characteristics.

Figure 8:
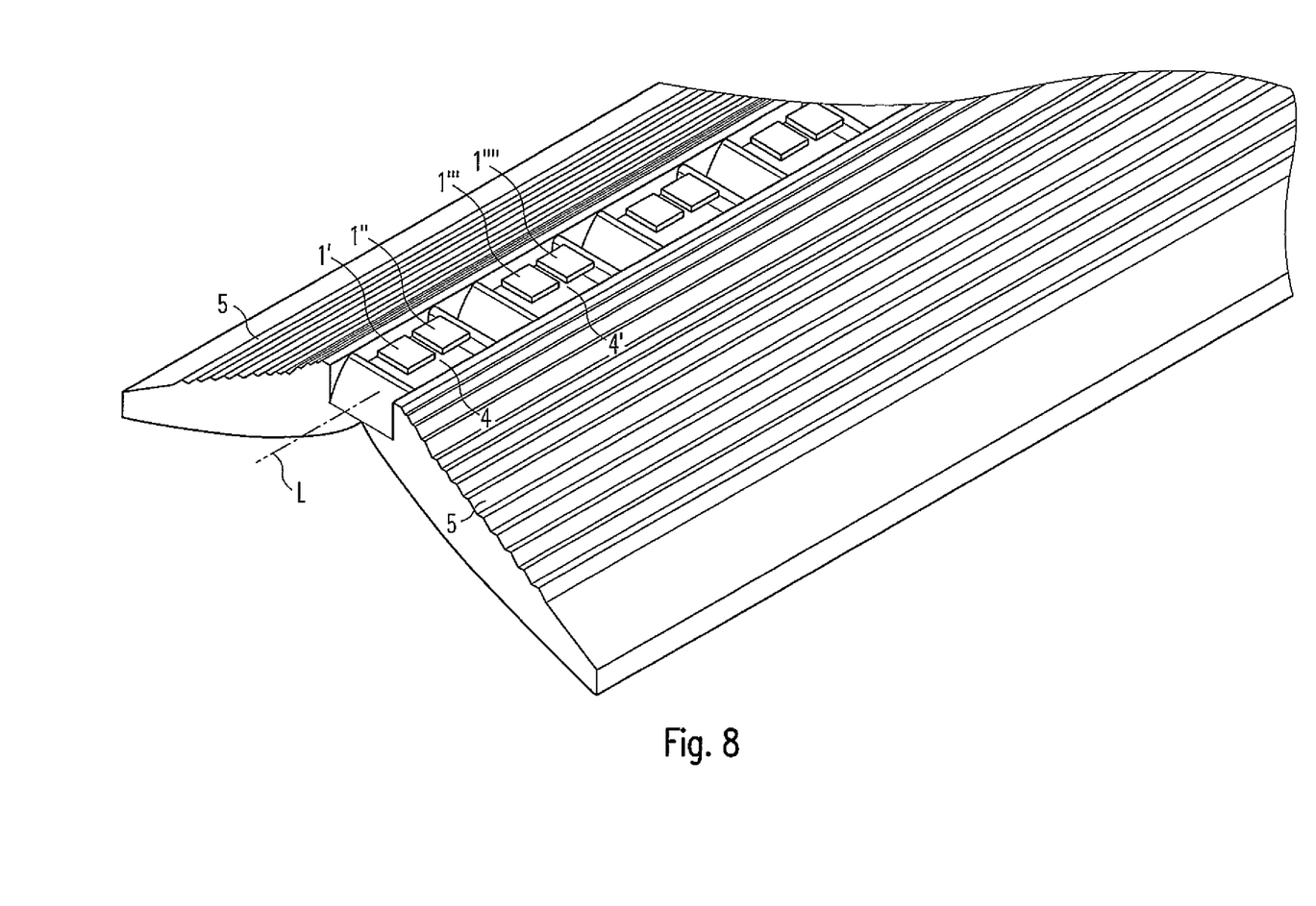
FIG. 8 shows a perspective schematic diagram of an end region of an optical element having recesses for in each case two LEDs.

The recess 4 may be designed to receive a light source 1 in the form of a plurality of LEDs. By way of example, FIG. 8 schematically depicts an embodiment in which the recess 4 is designed to receive at least, in particular exactly, two LEDs 1', 1". In this case, as depicted schematically, a plurality of recesses 4, 4' may be provided in a series extending parallel to the longitudinal axis L, wherein each of the recesses 4, 4' is designed for receiving at least two LEDs 1', 1" and 1''', 1'''', respectively.

Figure 9:
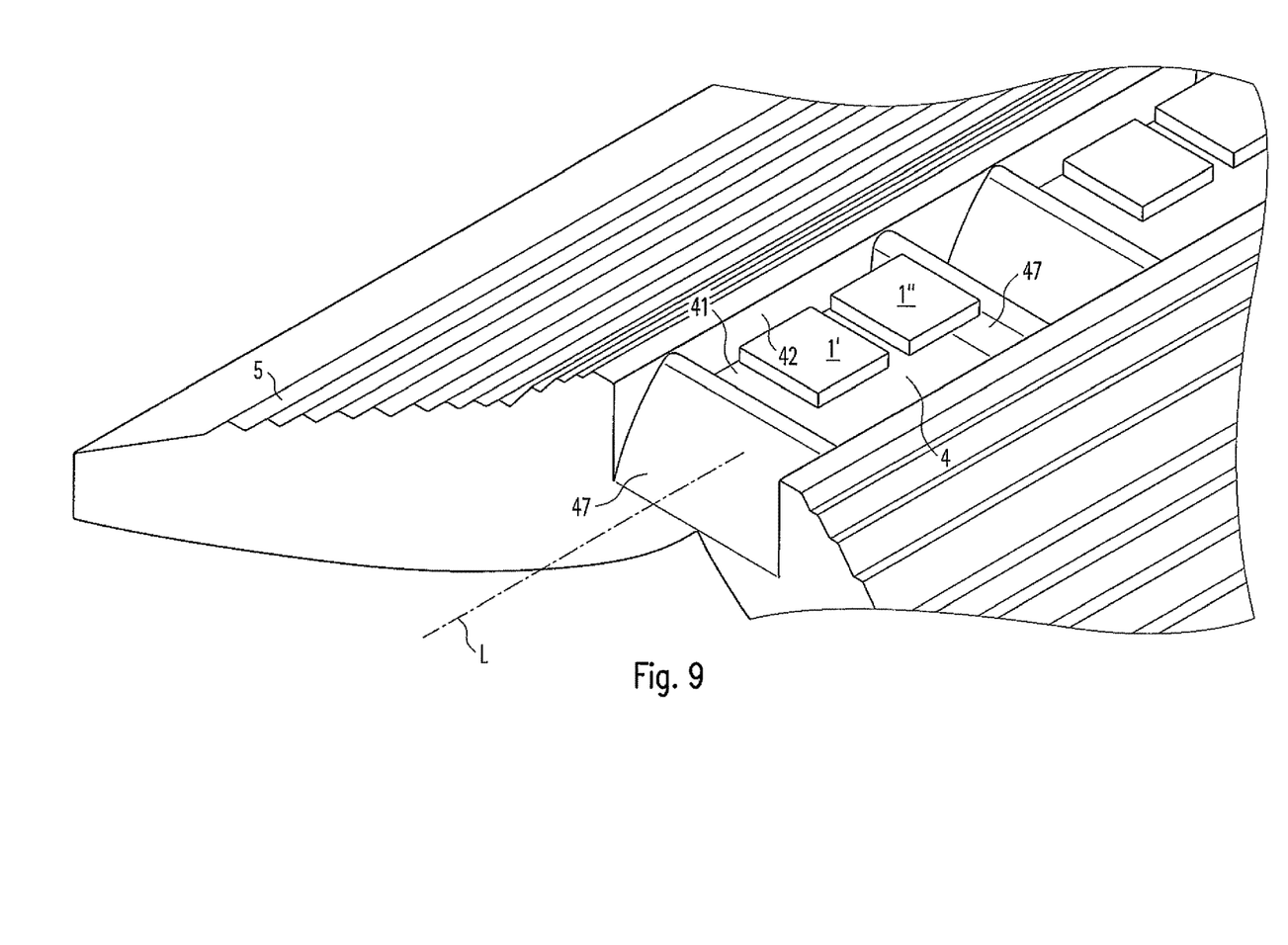
FIG. 9 shows a corresponding, somewhat more detailed illustration.
Figure 10:
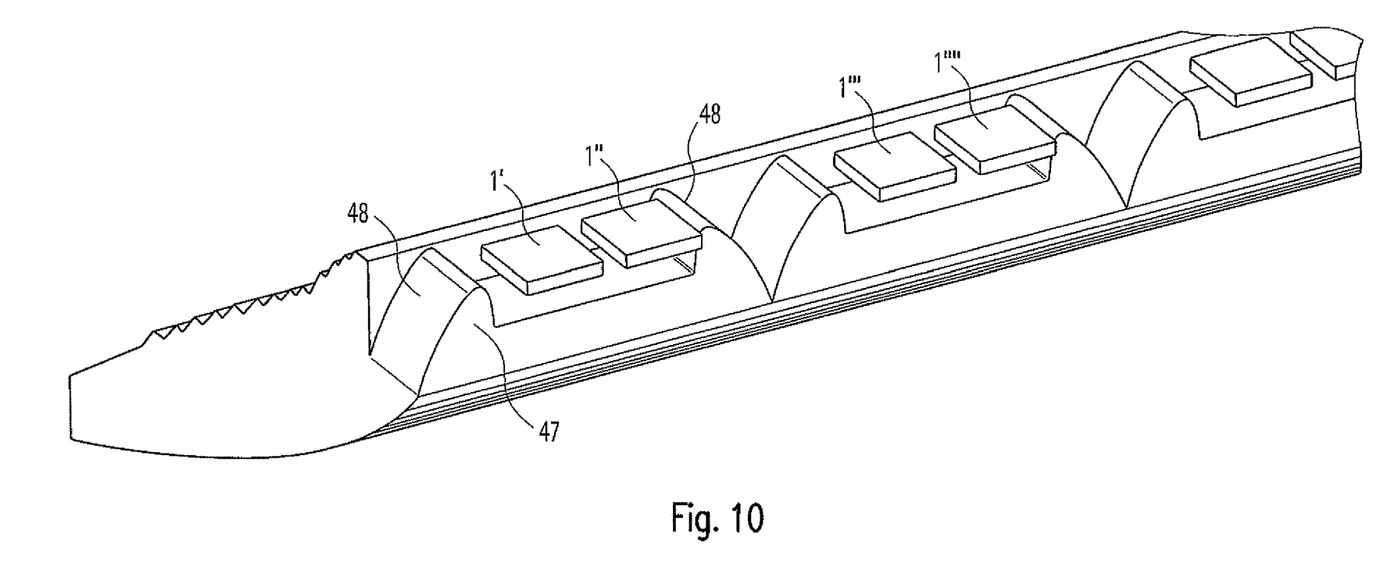
FIG. 10 shows a perspective schematic diagram of a longitudinal section along the plane of symmetry of the optical element.

FIG. 9 shows a somewhat more detailed schematic diagram. In this embodiment, the recess 4 or each of the recesses 4, 4' has two further side walls 47 extending transversely with respect to the longitudinal axis L. These further side walls 47 make it possible to achieve particularly suitably a suppression of glare in the longitudinal direction, that is to say in a direction parallel to the longitudinal axis L. As depicted schematically in FIG. 10, which shows a corresponding sectional illustration along the plane of symmetry S, for this purpose further surface regions 48 are preferably formed by the further side walls 47, at which further surface regions light rays of the light which enter the optical element via the further side walls 47 are subjected to total internal reflection.

Figure 11:
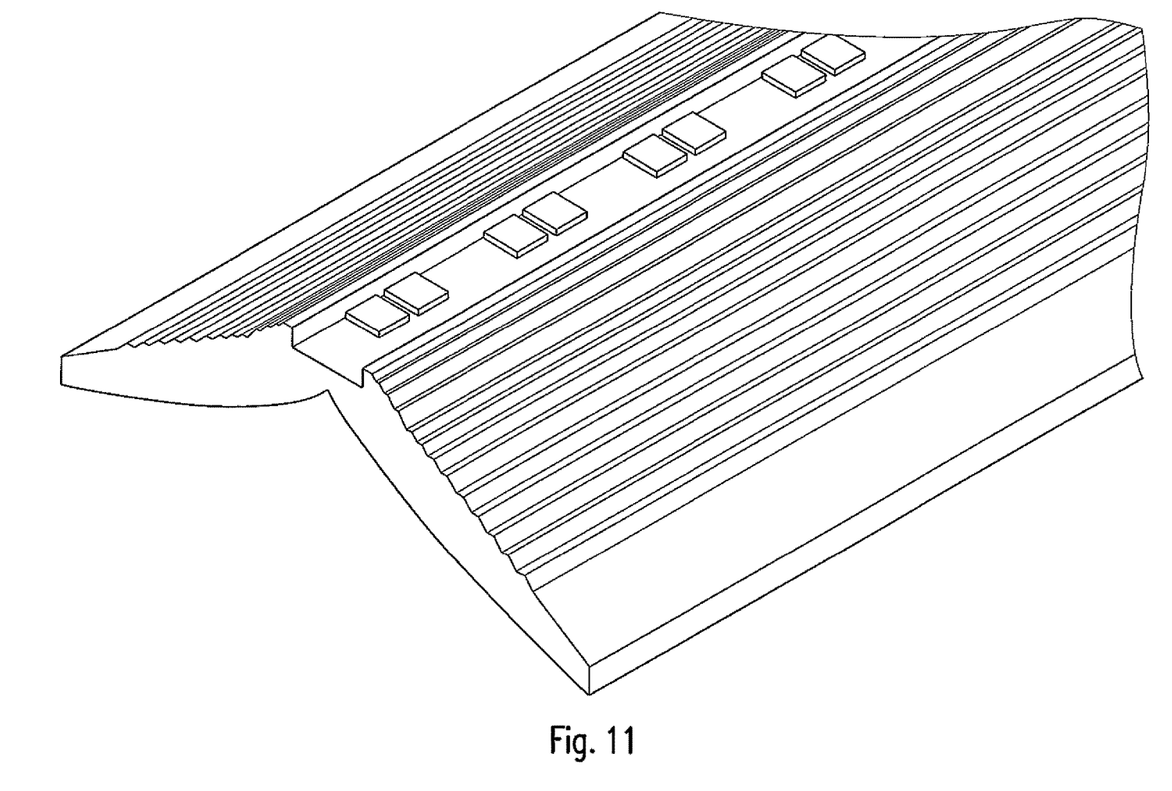
FIG. 11 shows a perspective schematic diagram regarding an embodiment having a profiled recess.

If a corresponding longitudinal suppression of glare is not required or is produced differently, that is to say that only the "transverse distribution" of the emission characteristic is important, the formation of the further side walls 47 may be dispensed with and the recess 4 may be designed in a profiled fashion advantageously in terms of production engineering, as depicted schematically in FIG. 11. This is advantageous because the optical element in this case may be produced particularly suitably as an extruded or injection molded part.

Figure 12:
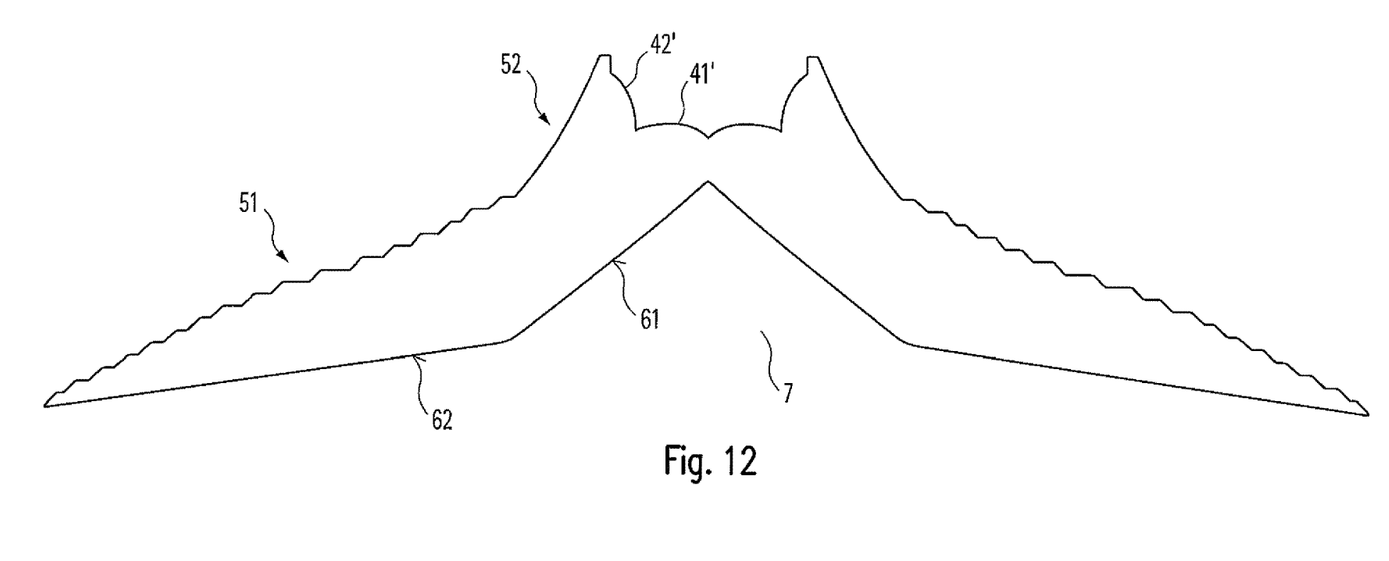
FIG. 12 shows a cross-sectional schematic diagram regarding a variation in which the recess has a doubly convexly curved base wall and convexly curved side walls.

FIG. 12 shows a cross-sectional schematic diagram regarding a variation of the optical element in which the recess 4 has a convexly shaped or multiply convexly shaped, for example doubly convexly shaped, base wall 41' and convexly curved side walls 42'. As a result, the light rays can be particularly suitably precollimated or particularly suitably concentrated upon entrance. In this way, the light can be used even more efficiently for the light emission and the optical element can be designed with a smaller material thickness.

Moreover, in this case, an outer part 51 of the deflecting surface region 5 may be designed in a structured fashion and—separate therefrom—an inner part 52 of the deflecting surface region 5 may be designed to be "steep" for achieving the total internal reflection. A glare suppressing effect can be suitably achieved as a result.

The front-side surface region 6 here has a first, inner portion 61 and a second, outer portion 62, wherein the depression 7 is formed by the first portion 61; here, however, unlike in the example shown in FIG. 2, the second portion 62 is not designed in a horizontally running fashion, but rather in a manner inclined slightly toward the front. In this case, the second portion 62 may be provided with a structuring in order to achieve a specific light emission characteristic.

Figure 13:
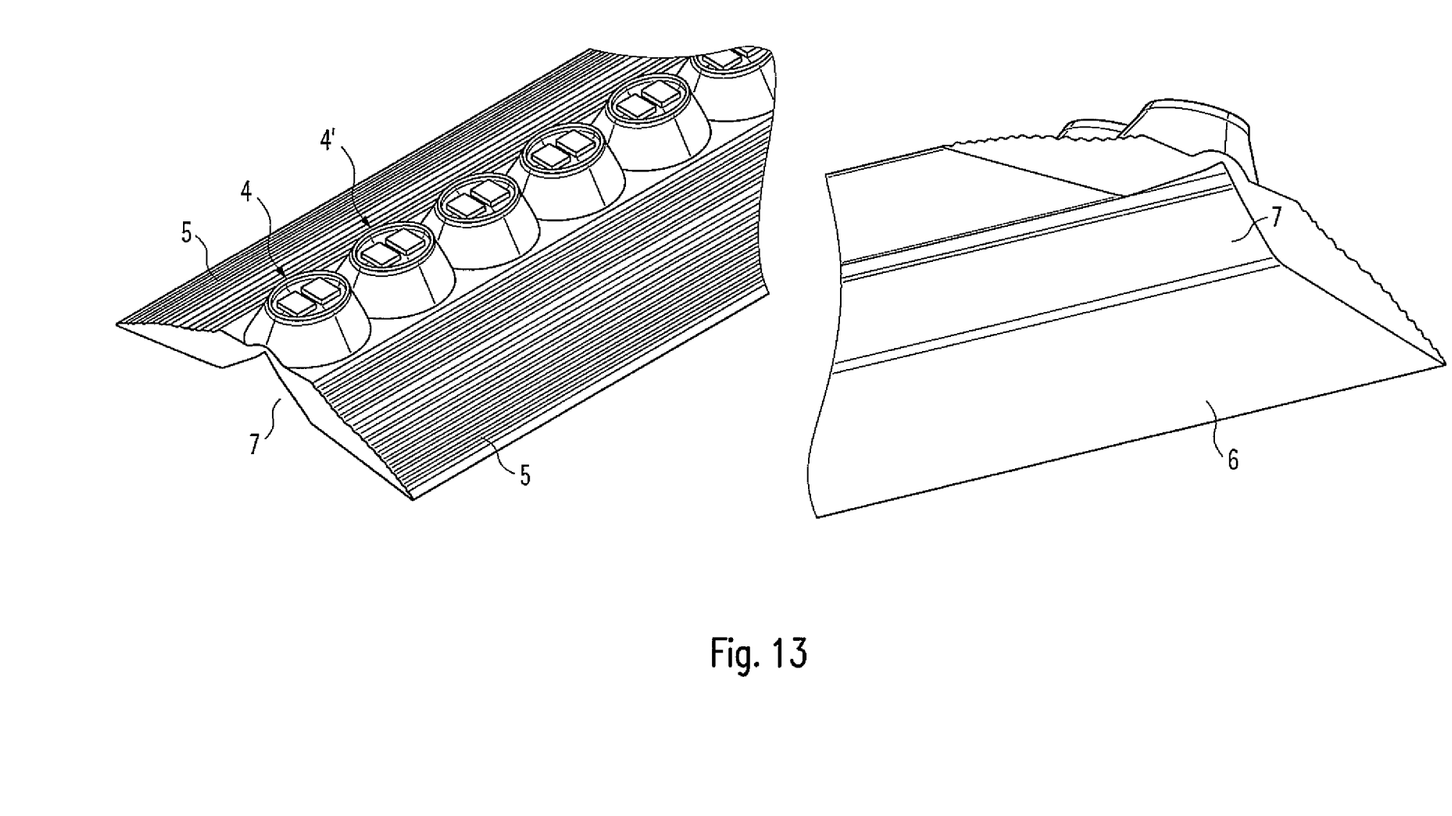
FIG. 13 shows two perspective schematic diagrams regarding a variation having circularly designed recesses.

FIG. 13 schematically depicts two perspective views of a variation according to which the recesses 4, 4' are designed with boundary walls whose outer surfaces in each case define conic section shapes. This is particularly advantageous with regard to achieving a suppression of glare in all vertical planes.

With an assembly according to the invention or an optical element according to the invention, high luminances at points, such as are typically generated for example by LEDs in the forward radiation, can be distributed between the "lens wings" of the optical element and thus be significantly reduced. The light can be directed in a targeted manner by a plurality of surface regions (recess 4, deflecting surface region 5, front-side surface region 6) and thus bring about a desired emission characteristic. No reflectively coated surfaces are required in this case. The optical element is also suitable for a plurality of LEDs per recess. The emission properties of a corresponding assembly for emitting light can be varied by exclusive variation of the rear side of the optical element.

The assembly according to the invention is suitable particularly for light strip luminaires, long field luminaires and retrofit applications in which fluorescent tubes are replaced by LED lines.

The invention claimed is:

1. An elongate optical element for influencing light emitted by a light source comprising:
   an elongate front side that it extends along a longitudinal axis facing away from the light source, and
   an elongate rear side that it extends along a longitudinal axis facing the light source,
   wherein at the rear side a light entrance region for entrance of the light is formed and moreover a deflecting surface region is formed, and at the front side a front-side surface region is formed, wherein first light rays (L1) of the light which enter the optical element via the light entrance region are subjected to total internal reflection at the deflecting surface region and subsequently leaves the optical element via the front-side surface region,
   wherein the front-side surface region is designed in a manner shaped in such a way that second light rays (L2) of the light which enter the optical element via the light entrance region and then impinge directly on the front-side surface region experience a total internal reflection there,
   wherein a plurality of recesses is provided in the rear side forming a series extending parallel to the longitudinal axis, and
   wherein each of the recesses in the plurality of recesses is sized to receive at least two light emitting diodes (LEDs) and each of the recesses has two further side walls extending transversely with respect to the longitudinal axis.

2. The optical element as claimed in claim 1, wherein the second light rays (L2) at least partly after they have experienced the total internal reflection at the front-side surface region, experience a further total internal reflection at the deflecting surface region.

3. The optical element as claimed in claim 1, wherein the front-side surface region is formed by a depression directed toward the light entrance region or comprises such a depression.

4. The optical element as claimed in claim 1, which is shaped in such a way that all light rays of the light which enter the optical element via the light entrance region and leave the optical element via the front-side surface region experience at least one total internal reflection at an interface of the optical element.

5. The optical element as claimed in claim 1, which is shaped symmetrically with respect to an axis of symmetry or plane of symmetry (S).

6. The optical element as claimed in claim 1, wherein the deflecting surface region is formed in a stepped fashion.

7. The optical element as claimed in claim 1, wherein the light entrance region is formed by the plurality of recesses.

8. The optical element as claimed in claim 7, wherein each of the plurality of recesses has a base wall and a pair of side walls extending parallel with respect to the longitudinal axis.

9. The optical element as claimed in claim 8, wherein the base wall is shaped in a plane or convex fashion or the side walls are shaped in a plane or convex fashion.

10. The optical element as claimed in claim 1, in the form of a profile element.

11. An assembly for emitting light, comprising
    a LED light source for providing emitted light, and
    an optical element as claimed in claim 1 positioned adjacent the LED light source, wherein the emitted light enters the optical element at least partly via the light entrance region.

* * * * *